(No Model.) 2 Sheets—Sheet 1.

N. A. WALKER.
BUTTERCUP CUTTER.

No. 486,917. Patented Nov. 29, 1892.

Witnesses:
William S. Gary
Helen E. Gerrish

Nelson A. Walker, Inventor.

By
Howard Henderson, Attorney (No Model.) 2 Sheets—Sheet 2.

N. A. WALKER.
BUTTERCUP CUTTER.

No. 486,917. Patented Nov. 29, 1892.

Witnesses:
William S. Gary
Helen E. Gerrish

Nelson A. Walker, Inventor.
By
Howard Henderson, Attorney.

UNITED STATES PATENT OFFICE.

NELSON A. WALKER, OF CHICAGO, ILLINOIS.

BUTTERCUP-CUTTER.

SPECIFICATION forming part of Letters Patent No. 486,917, dated November 29, 1892.

Application filed February 23, 1892. Serial No. 422,539. (No model.)

*To all whom it may concern:*

Be it known that I, NELSON A. WALKER, of Chicago, in the county of Cook and State of Illinois, have invented certain new and useful Improvements in Buttercup-Cutters; and I do hereby declare that the following is a full, clear, and exact description thereof, reference being had to the accompanying drawings, and to the letters of reference marked thereon, which form a part of this specification.

Similar letters of reference indicate like parts.

My invention relates to candy-cutters, and has special reference to the making of that style of candies known as "buttercups." These candies are about one-half inch square and generally contain nut-meat centers or a center of some soft substance. The ends of the buttercups must meet and join or the center, if it be composed of a soft or liquid substance, will run out and thus be lost and cause the buttercups to stick together, and therefore the candy is cut while hot, so that the ends of the buttercups will join before cooling.

Figure 1:
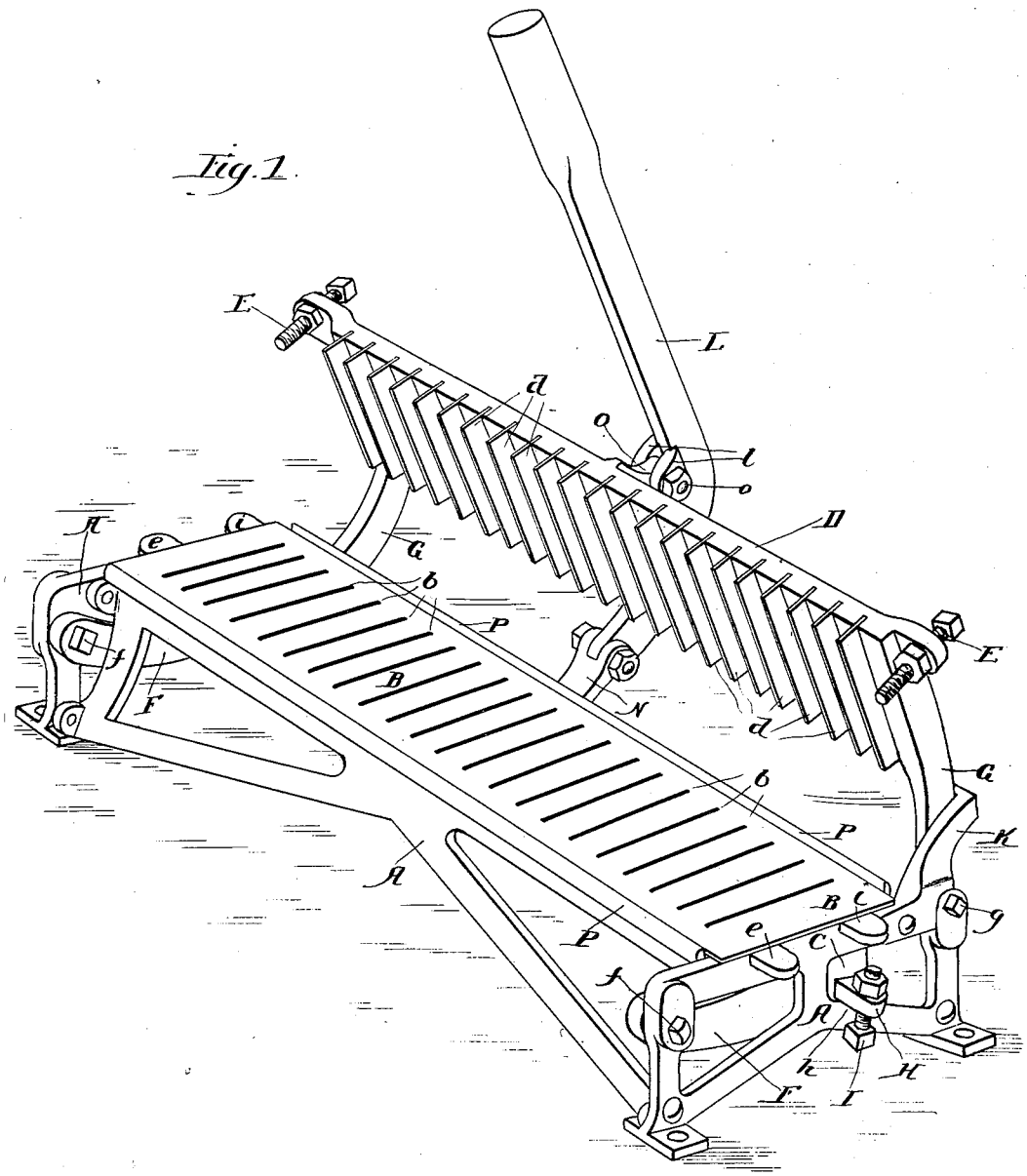
Figure 2:
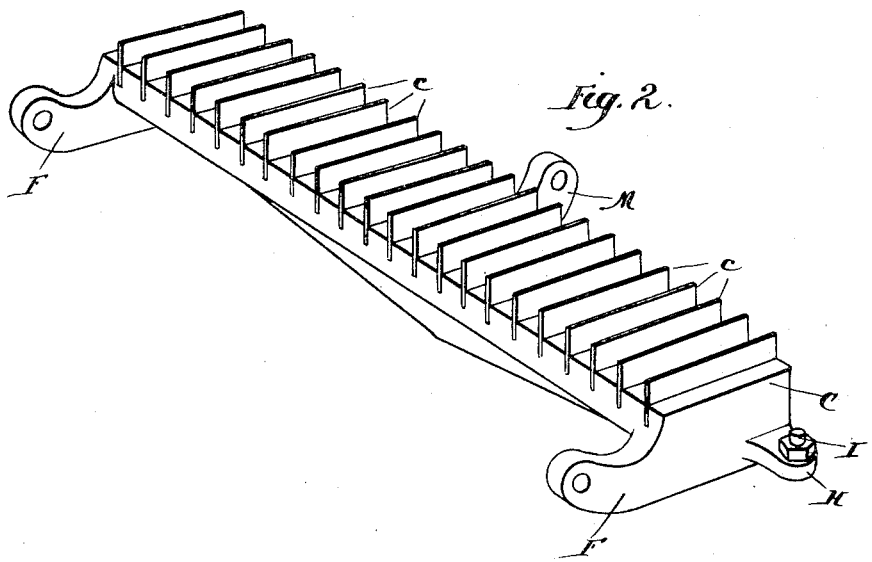
Figure 3:
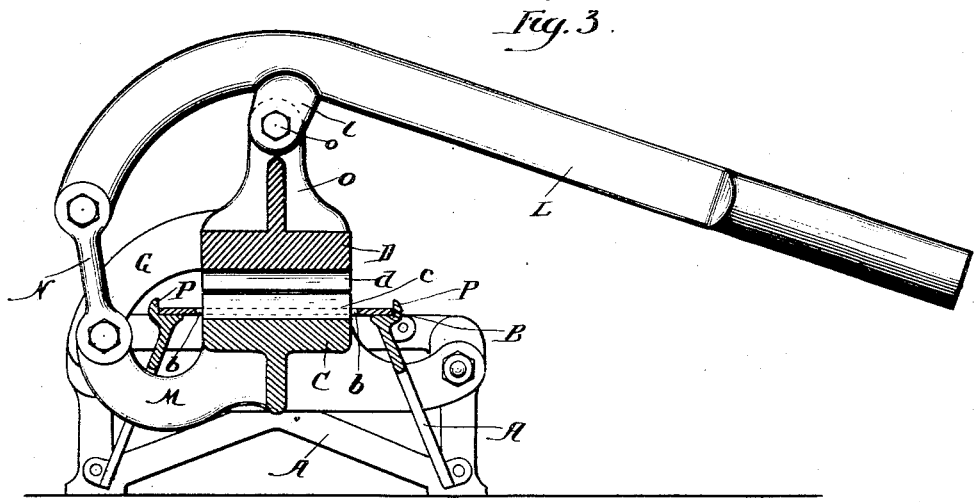

In the drawings forming part of this specification, Figure 1 represents a perspective view of the machine in a position to receive the candy for cutting. Fig. 2 represents a perspective view of the lower jaw. Fig. 3 represents a cross-section of the machine, showing the position after the candy is cut.

A, Fig. 1, is a frame having a slotted bed B and lips or ribs P P running along the sides of the slotted bed B to prevent the candy from falling off the sides. About five inches is a convenient width for the bed B, thus allowing the cutting of several strips of candy at the same time. The slots $b$ of the bed B are at such distance from each other and of such width as to allow the teeth $c$ of the lower jaw C, Fig. 2, to pass through them.

D is the upper jaw, having cutters or teeth $d$, slightly sharpened, running the full width of the jaw and about one-half inch in height from the bed of the jaw.

C is the lower jaw, having similar cutters or teeth $c$, Fig. 2. These cutters or teeth in each of the jaws are at equal distance from each other and sufficient in number to correspond with the number of slots in the bed B, and are of such distance from each other as is thought advisable; but eleven-sixteenths of an inch will be found a good distance for practical use.

The upper jaw is provided with adjusting-screws E E, one at each end, the lower ends of which when the jaw is lowered rest upon the lugs $e\ e$ of the frame A to regulate the action of the jaw in pressing or cutting the strips of candy in the making of the buttercups. The arms G G of the upper jaw D are hinged or pivoted to the back of the frame at the point indicated by $g$. Near the point $g$ on one end of the frame A is a check or stop K to prevent the upper jaw from swinging back too far.

The lower jaw rests in the frame A, the arms F F, Figs. 1 and 2, being pivoted to the front part of the frame at the points $f\ f$, Fig. 1. It also has a lug H, Figs. 1 and 2, at each end for the purpose of supporting the jaw upon the frame A at the point $h$, Fig. 1, and these lugs also have an adjustable screw I, the end of which is adapted to contact with the lug $i$ on the frame A for the purpose of regulating the height to which the lower jaw shall reach.

The jaws are brought together (the teeth of the lower jaw coming through the slots of the bed B) by means of a handle or lever L, which is connected with the arm M of the lower jaw by means of the link N, the handle L, having a lug $l$ cored to fit the projection O on the upper jaw, Fig. 3. The lug $l$ and projection O on the upper jaw are pivoted at $o$. By the lowering of the handle L, connected with the lower jaw by means of the link N, Fig. 1, the upper jaw is thrown forward and downward for use and the lower jaw raised, the teeth of the lower jaw passing through the slots $b$ of the bed B to meet the teeth of the upper jaw. For the cutting of some kinds of candy it is desirable to have the cutters or teeth meet. For other kinds the cutters or teeth should come nearly, but not quite, together, as the candy, becoming cooled and brittle in the process of cutting, breaks of itself when partially cut. Therefore the screws E and I are for the purpose of regulating the proper distance between the teeth of the upper and lower jaw when closed, according to the kind of candy made. The raising of the handle after the cutting of the candy lowers the under jaw, so as to leave the slotted bed or plate B free for removing the made candies in an easy and expeditious manner by a single sweep of the hand or brush. The frame has a lug or foot at each of the corners with screw-holes for fastening to the table. The slotted bed-plate B can be stationary or adjustable, and I do not confine myself to either construction.

I claim as my invention and desire to secure by Letters Patent—

In a candy-cutter, the frame A, having lips or ribs P P, lugs $e\,e$ and $i\,i$, and check or stop K, in combination with the upper jaw D, with cutters or teeth $d$, projection O, arms G G, and adjustable screws E E, the lower jaw C, having cutters or teeth $c$, arm or projection M, the arms F F, lugs H, with adjustable screw I, the slotted bed B, the link N, and the handle L, having lug $l$, substantially as described.

NELSON A. WALKER.

Witnesses:
 WILLIAM S. GARY,
 HELEN E. GERRISH.